United States Patent Office 2,752,165
Patented June 26, 1956

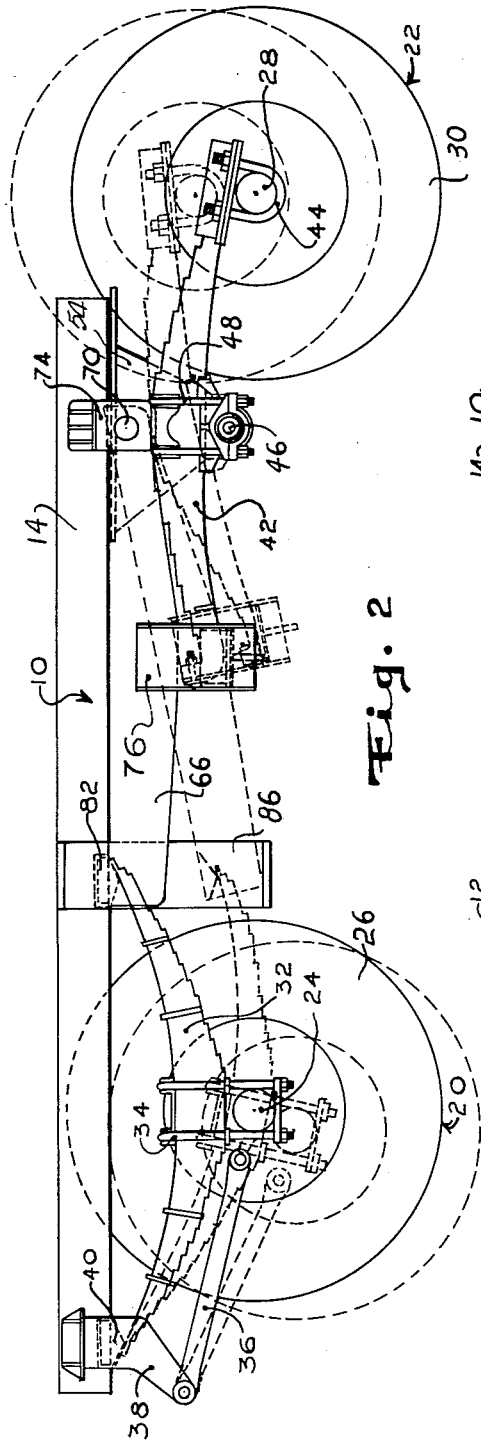
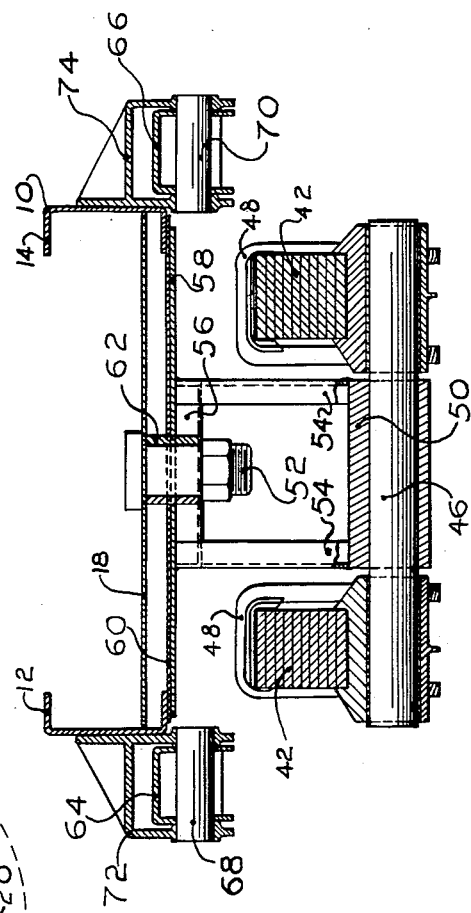

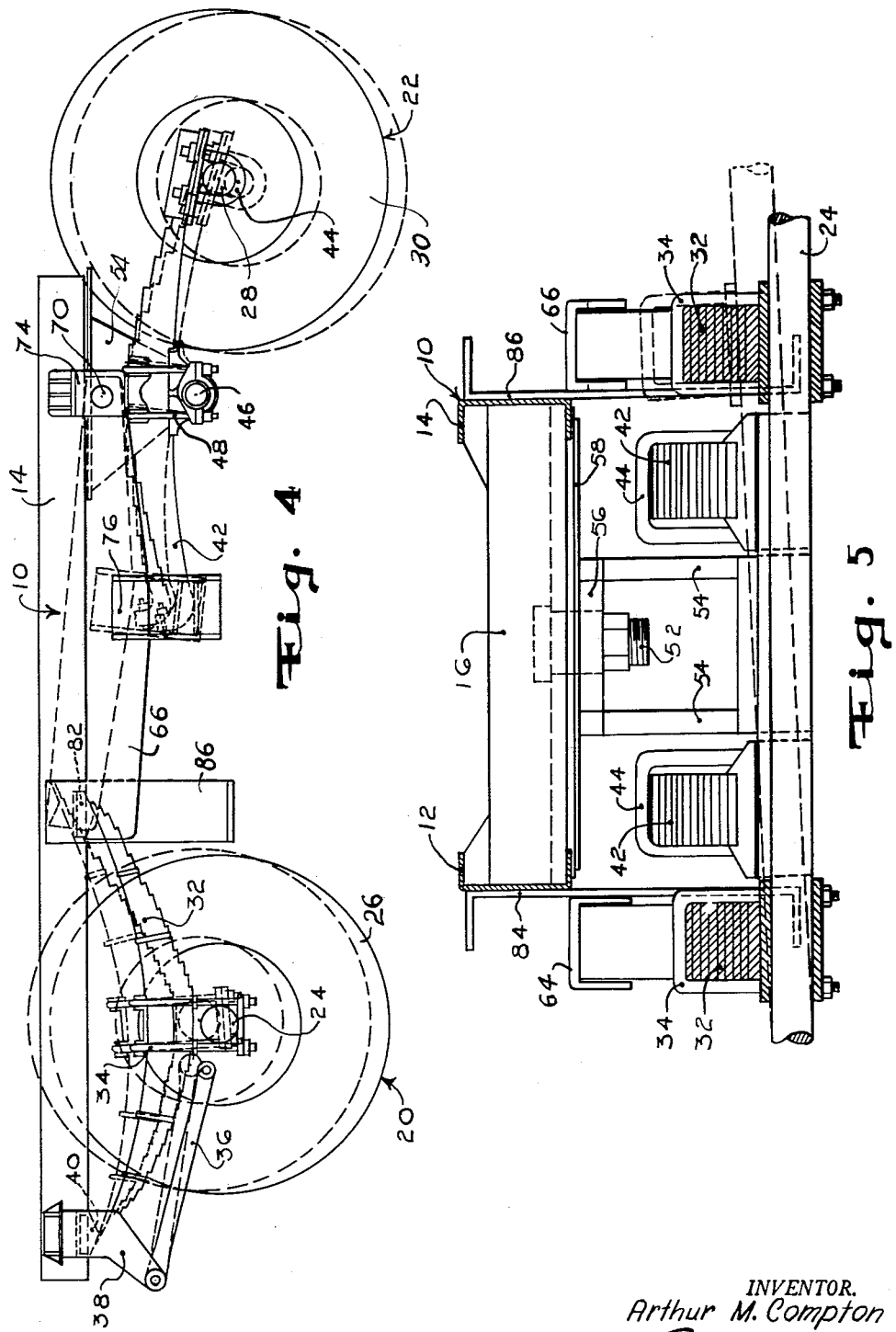

2,752,165
LEAF SPRING SPREAD TANDEM AXLE ASSEMBLY

Arthur M. Compton, Bethel, Kans., assignor, by mesne assignments, to Standard Steel Works, Inc., Dallas, Tex., a corporation of Texas Application July 30, 1953, Serial No. 371,307

7 Claims. (Cl. 280—104.5)

This invention relates to multi-wheel vehicles and particularly to a tractor and trailer combination wherein the trailer is provided with a pair of tandem wheel and axle assemblies and is connected with the tractor at the front thereof by the usual fifth wheel construction at the rear of the tractor.

The allowable gross load for a trailer of this type constitutes the total of a fixed amount for the rear tractor axle and a fixed amount for each of the trailer axles. The various state laws in this respect provide for load limitations in accordance with the distances between the tandem axles, and it is accordingly, the primary object of this invention to provide an undercarriage for trailers adapted to support a maximum pay load without exceeding allowable overall length and gross loads per axle in accordance with state-law requirements.

It is the most important object of this invention to provide an arrangement of tandem wheel and axle assemblies for a trailer having an increased spacing therebetween whereby the trailer may carry a maximum pay load and having a novel construction for efficiently distributing the load of the trailer between the two assemblies.

An object of this invention is to provide a transportation vehicle in the nature of a trailer for use with a tractor wherein the wheels supporting one of the axles will "track" properly with respect to the front wheels of the trailer and the rear wheels of the tractor so as to avoid dragging and scuffing of the tires, as well as excessive wear and tear on the various component parts of the entire undercarriage itself.

Another important object hereof is to provide a novel suspension for all of the wheels of a transportation vehicle in the nature of a trailer permitting independent vertical movement of each axle in response to uneven terrain, all while maintaining the aforementioned prerequisite of proper tracking of the rearmost wheels disposed a relatively great distance from the dirigible wheel and axle assembly of the tractor.

A still further object of this invention is to provide an undercarriage of the type having a pair of tandem axles so suspended as to permit vertical movement of the axles independently or relatively in response to rises and falls in the terrain, all while maintaining proper load distribution as aforementioned.

It is an additional object of this invention to provide a transportation vehicle as above set forth capable of withstanding load shifts or unequal loading tending to cause the trailer to list particularly on curves and while making sharp turns.

In the drawings:

Figure 1 is a top plan view of a transportation vehicle in the nature of a trailer adapted for use with a tractor showing its chassis only and a leaf spring spread tandem axle assembly therefor made pursuant to the present invention and illustrating by dash lines the relative positions of the component parts thereof as the forwardmost end of the trailer is shifted laterally by the tractor to manipulate a turn.

Fig. 2 is a side elevational view thereof illustrating by dash lines the relative positions of the component parts when the front wheels drop and the rear wheels rise in response to uneven terrain.

Fig. 3 is a transverse, cross-sectional view taken on line III—III of Fig. 1 with the rear wheel and axle assembly omitted.

Figure 1:
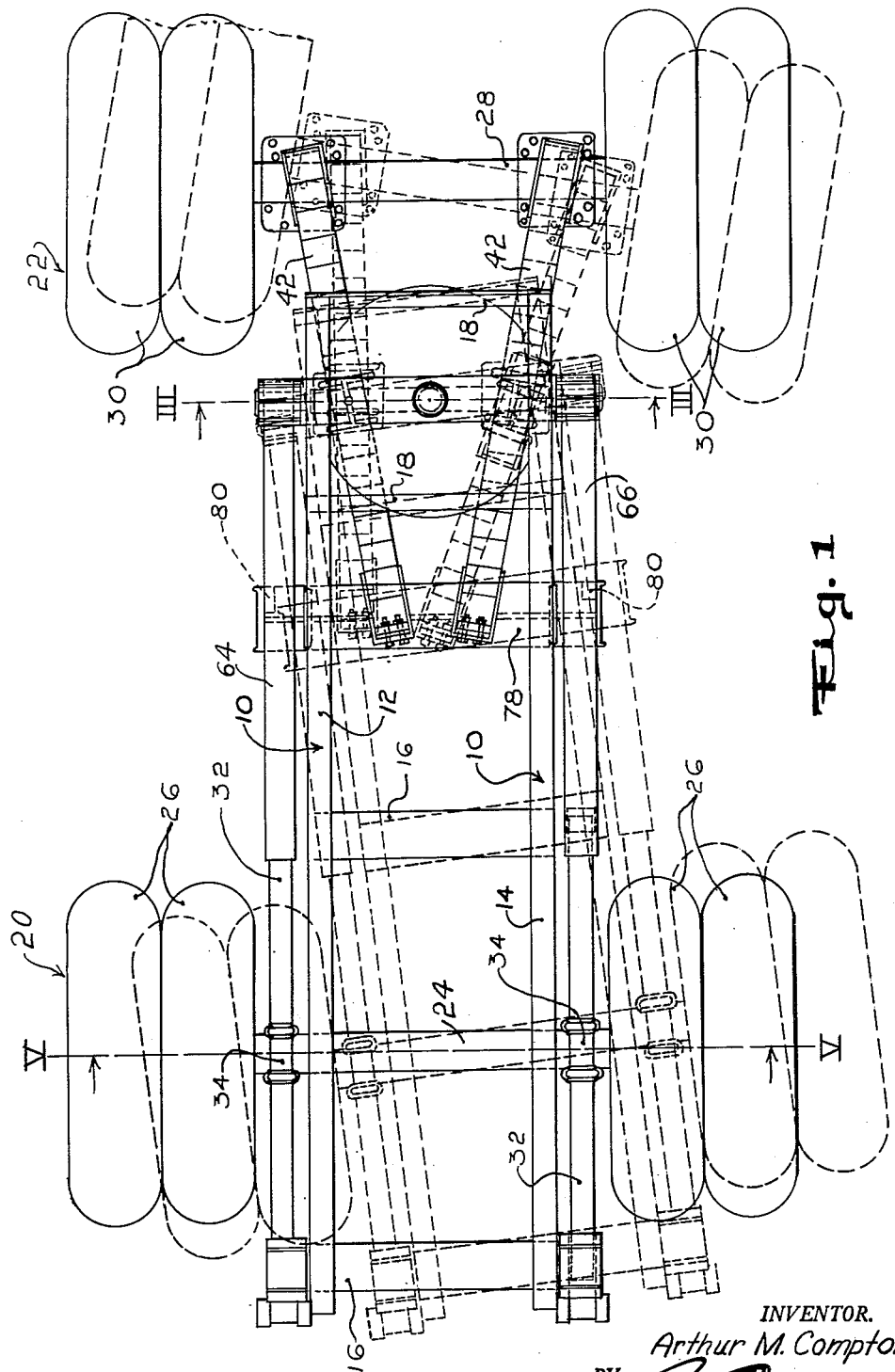

Fig. 4 is a view similar to Fig. 2 illustrating by dash lines the relative positions of the component parts when the front wheels rise and the rear wheels fall in response to uneven terrain; and Fig. 5 is a cross-sectional view taken on line V—V of Fig. 1 with the wheels omitted and illustrating by dash lines the inclination of the rearmost axle with respect to the frame of the trailer when the rear wheels are resting upon an inclined terrain.

The tractor with which the trailer hereof is adapted to be used, is not illustrated in the drawings, but since the same forms no part of the present invention it may be made clear only that any suitable coupling may be utilized such as the conventional fifth wheel assembly.

The trailer chassis chosen for illustration of the improved undercarriage hereof includes a frame broadly designated by the numeral 10, and as shown most clearly in Figs. 3 and 5, the same constitutes a pair of longitudinal beams 12 and 14 in the form of inwardly facing channel members that are in turn connected by a number of cross beams 16 and a pair of cross bars 18 at the rearmost end of the beams 12 and 14.

The undercarriage includes a pair of wheel and axle assemblies broadly designated by the numerals 20 and 22 respectively. The front assembly 20 has an axle 24 and two pairs of ground-engaging wheels 26 rotatably mounted on the axle 24 in the usual manner. Similarly, the rear assembly 22 is provided with an axle 28 and corresponding wheels 30.

The frame 10 is supported by the front axle 24 through the medium of a spring unit composed of a pair of preferably parallel, downwardly bowed leaf springs 32 secured directly to the axle 24 by U-straps and the necessary blocks, clamps, brackets and the like broadly designated by the numeral 34 midway between the ends of the springs 32, it being noted in Fig. 1 that the distance between springs 32 is greater than the distance between the beams 12 and 14. Direct connection between the axle 24 and the frame 10 is made through use of radius or lead rods 36 pivotally joining each of the connections 34 respecitvely, with brackets 38 depending from the frame 10 at the forwardmost end thereof. Each of the brackets 38 is in turn provided with a wear plate 40 in overlying engagement with the forwardmost end of the corresponding spring unit 32.

A spring unit for the rearmost axle 28 constitutes a pair of upwardly bowed semi-elliptical leaf spring assemblies 42 that are joined in spaced-apart relationship at the rearmost ends thereof directly to the rear axle 28 by means of clamps that include U-straps 44 in the usual manner. The lead spring assemblies 42 diverge as the axle 28 is approached and are joined rigidly to a stub shaft 46 by means of clamps that include U-straps 48. The shaft 46 may either underlie the springs 42 as shown, or be joined thereto above the springs 42 and is clamped in place in parallelism with the axle 28 beneath the frame 10 as shown most clearly in Fig. 3.

The shaft 46 is mounted for pivotal movement on a normally horizontal axis within a suitable bearing 50 midway between the ends of the shaft 46 and between the clamping means that includes U-straps 48. The bearing 50 is in turn mounted for rotation on a normally vertical axis through the medium of a pivot bolt 52. A pair of triangular-shaped plates 54 secured rigidly to the bearing 50 at their lowermost ends, are joined at their uppermost ends by a brace member 56 and the latter, together with the plates 54, are secured to a circular turntable plate 58 in underlying engagement with a similar plate 60 connected rigidly to cross bars 18 and beams 12 and 14. Spacer means 62 through the plates 58 and 60, and the brace element 56, provides a bearing for the pivot bolt 52.

Load equalization of stabilizing structure takes the form of a pair of parallel rocker arms 64 and 66 for beams 12 and 14 respectively, each of which is in the form of an inverted channel as shown in Figs. 3 and 5 and pivotally secured to the frame 10 for free swinging movement on a normally horizontal axis through the medium of pintles 68 and 70 respectively. The rocker arms 64 and 66 extend forwardly from the pivotal connections 68 and 70 and the rearmost ends thereof swing within brackets 72 and 74 respectively that mount the pintles 68 and 70. Each of the brackets 72 and 74 is in the form of an inverted U, and are secured to the outermost faces of the beams 12 and 14 respectively in alignment with the pivot bolt 52.

The rocker arms 64 and 66 are interconnected for swinging movement as a single unit by means of a U-shaped frame piece 76, intermediate the ends of the arms 64 and 66, and having its bight 78 in underlying relationship to the arms 64 and 66 and beneath the forwardmost ends of the springs 42. This bight 78 serves as a wear plate for the springs 42 that are free to slide thereon as the rear wheel and axle assembly 22 swings relative to the frame 10 and the rocker arms 64 and 66 on the pivot bolt 52. Stop locks 80 on the frame piece 76 within the path of travel of the innermost ends of the springs 42, limit the extent of swinging movement of the assembly 22 on the pivot bolt 52.

Each of the rocker arms 64 and 66 embraces and overlies the rearmost end of a corresponding spring 32 for the unit 20 and is provided with a wear plate 82 in overlying sliding engagement with such corresponding spring 32. The extent of downward swinging movement of the forwardmost ends of the rocker arms 64 and 66 on the pintles 68 and 70, is limited by U-shaped stops 84 and 86 rigid to the outermost faces of the beams 12 and 14 respectively and depending therefrom as is most clear in Fig. 5 of the drawings.

Through the provision of such novel suspension it is possible to appreciably increase the distance between the axles 24 and 28 over and above the conventional fifty (50) inch spacing and it is contemplated that efficient operation with an appreciably increased pay load may be attained with the axles 24 and 28 spaced as much as one hundred ten (110) inches apart. The load is not only properly equalized between the axles 24 and 28, but the rear wheel and axle assembly 22 will track properly without the necessity of auxiliary steering mechanism by virtue of the turntable arrangement therefor operating in conjunction with the manner of mounting the springs 32 and 42 in interconnected relationship through the use of the equalizer unit that includes interconnected rocker arms 64 and 66.

The turning movement of the rear assembly 22 is absolutely automatic in response to lateral displacement of the frame 10 by the tractor with which the trailer hereof is used. As shown in Fig. 1 of the drawings, it is seen by dash lines that as the forwardmost end of the frame 10 is manipulated through a turn in one direction by the tractor in towing relationship thereto, the entire rear assembly 22 will be forced into a turn in the opposite direction as the shaft 46, bearing 50 and its connection with plate 58, rotate on the vertical axis of pivot bolt 52. During such forced turning movement of the assembly 22, the shaft 46 and the axle 28 remain in parallelism, but the springs 42 rigid to the axle 28 and to the shaft 46, swing as a unit on the bolt 52 with respect to the rocker means 64 and 66. Furthermore, during such lateral swinging movement of the assembly 22, relative to the frame 10, the forwardmost juxtaposed ends of the springs 42 slide freely on the wear plate 78 that constitutes the bight of the frame piece 76 interconnecting rocker arms 64 and 66. It is also seen in Fig. 1 of the drawings, that while the axle 28 changes its position relative to the frame 10 during turning movement of the trailer in either direction, the relative positions of the axle 24, wheels 26 and springs 32 to the frame 10, remain the same.

Rise and fall of the axles 24 and 28 is depicted by Figs. 2 and 4 of the drawings, and it is seen that at all times, axle 24 is free to move vertically relative to the frame 10 independently of the movement of axle 28. In the event the front wheels 26 drop into a depression within the terrain, axle 24 is free to descend not only because of the pivotal connection with the frame 10 through the radius rods 36, but by virtue of the free sliding movement of the ends of the springs 32 on the wear plates 40 and 82, but because of the free swinging movement of the rocker arms 64 and 66. Thus, as shown in Fig. 2, when the axle 24 drops, frame 10 remains substantially horizontal, axle 24 rotates slightly on its longitudinal axis, radius rods 36 swing downwardly and the springs 32 swing downwardly at the rearmost ends thereof while sliding on the wear plates 40 and 82. Such downward swinging movement of the springs 32 permits the rocker arms 64 and 66 to likewise swing downwardly at their forwardmost ends on the pintles 68 and 70 limited only by the stops 84 and 86.

If, at the same time, the rear wheels 30 pass over a rise in the terrain as shown by dash lines in Fig. 2, the rear axle 28 will move upwardly and pivot on the longitudinal axis thereof. The forwardmost ends of the springs 42 will however, be held against downward swinging movement in response to the rise of the rear axle 28 because of the fact that the same are supported by the rocker arms 64 and 66 through the wear plate 78 as determined by the tension in the springs 32 unless the latter also swing as shown in Fig. 2, in which event the forwardmost ends of the springs 42 will follow the arms 64 and 66 downwardly as springs 42 pivot on the axis of the shaft 46 therewith and within the bearing 50.

Figure 4 of the drawings shows by dash lines the way in which the rocker arms 64 and 66 equalize the load between the axles 24 and 28 and maintain the frame 10 substantially horizontal when the wheels 26 and 30 pass over rises in the terrain. The frame 10 therefore, and its entire load, is completely cushioned and resiliently supported upon all four springs 32 and 42, and the arms 64 and 66 are not only highly responsive to uneven terrain, but the springs 32 and 42 themselves slide freely on their corresponding wear plates and flex longitudinally to minimize jars and jolts over all kinds of roads and highways. In this respect, it is to be noted that the rear springs 42 not only slide longitudinally of the wear plates 78 but transversely thereof in cooperation with the turning movement of the axle 28 on its longitudinal axis whether or not the movement is such as to cause rotation of the shaft 46 in the bearing 50.

Having thus described the invention, what is claimed as new and desired to be secured by Letters Patent is:

1. In a transportation vehicle having a trailer adapted for use with a tractor and provided with a frame, an undercarriage including a pair of spaced, tandem wheel and axle assemblies; an elongated, front spring unit having a forwardmost end disposed in supporting relationship to the frame; means attaching said unit intermediate the ends thereof to the axle of one of said assemblies; an elongated, rear spring unit; means attaching the rearmost end of the rear unit to the axle of the other assembly; means swingably attaching said rear unit intermediate the ends thereof to said frame; elongated rocker means having a rearmost end and extending forwardly toward the front unit; pivot means at said rearmost end of the rocker means securing the same to the frame for swinging movement on a horizontal axis; means at the forwardmost end of the rocker means adapting the latter for support by the rearmost end of the front unit; and structure on the rocker means intermediate the ends thereof supporting the forwardmost end of the rear unit, whereby the front unit yieldably biases the rear unit toward one end of its swinging path of travel.

2. In a transpkation vehicle as set forth in claim 1 wherein the axis of swinging movement of the rear unit is normally parallel with the axis of swinging movement of the rocker means; and wherein said rear unit is provided with means pivotally securing the same to the frame for swinging movement on a vertical axis, said forwardmost end of the rear unit being shiftable relative to said structure.

3. In a transportation vehicle as set forth in claim 2 wherein the axes of swinging movement of the rear unit are in a common vertical plane.

4. In a transportation vehicle having a trailer adapted for use with a tractor and provided with a frame, an undercarriage including a pair of spaced, tandem wheel and axle assemblies; a pair of spaced, elongated front springs, each having a forwardmost end disposed in supporting relationship to the frame; means attaching said front springs intermediate the ends thereof to the axle of one of said assemblies; a pair of spaced, elongated rear springs; means attaching the rearmost end of the rear springs to the axle of the other assembly; means swingably attaching said rear springs intermediate the ends thereof to said frame; elongated rocker means having a rearmost end and extending forwardly toward the front springs; pivot means at said rearmost end of the rocker means securing the same to the frame for swinging movement on a horizontal axis; means at the forwardmost end of the rocker means adapting the latter for support by the rearmost ends of the front springs; and structure on the rocker means intermediate the ends thereof supporting the forwardmost ends of the rear unit, whereby the front springs yieldably bias the rear springs toward one end of their swinging path of travel.

5. In a transportation vehicle as set forth in claim 4 wherein the axis of swinging movement of the rear springs is normally parallel with the axis of swinging movement of the rocker means.

6. In a transportation vehicle as set forth in claim 5 wherein the axis of swinging movement of the rocker means is spaced above the axis of swinging movement of the rear springs and normally in a common vertical plane therewith.

7. In a transportation vehicle having a trailer adapted for use with a tractor and provided with a frame, an undercarriage including a pair of spaced, tandem wheel and axle assemblies, each provided with a spring unit, each unit being disposed in supporting relationship to said frame; rocker means pivotally secured at one end thereof to the frame for swinging movement on a horizontal axis and supported at the opposite end thereof by one of said units; and structure on the rocker means supporting one end of the other unit, said other unit being provided with means pivotally securing the same to the frame for swinging movement on a vertical axis, said one end of the other unit being shiftable relative to said structure.

References Cited in the file of this patent

UNITED STATES PATENTS

| | | |
|---|---|---|
| 1,507,848 | Miller | Sept. 9, 1924 |
| 1,643,811 | Hyde | Sept. 27, 1927 |
| 1,855,868 | Porter | Apr. 26, 1932 |
| 2,291,174 | Stewart | July 28, 1942 |
| 2,653,035 | Ward | Sept. 22, 1953 |